United States Patent
Park et al.

(10) Patent No.: US 11,251,438 B2
(45) Date of Patent: Feb. 15, 2022

(54) TUBE STRUCTURE HAVING METAL ON INNER SURFACE THEREOF

(71) Applicants: LG CHEM, LTD., Seoul (KR); KOREA ADVANCED INSTITUTE OF SCIENCE AND TECHNOLOGY, Daejeon (KR)

(72) Inventors: Eunkyung Park, Daejeon (KR); Jang Wook Choi, Daejeon (KR); Byung Gon Kim, Daejeon (KR); Minchul Jang, Daejeon (KR); Byoungkuk Son, Daejeon (KR); Junghun Choi, Daejeon (KR); Donghyeon Kang, Daejeon (KR)

(73) Assignees: LG ENERGY SOLUTION, LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 75 days.

(21) Appl. No.: 16/268,925

(22) Filed: Feb. 6, 2019

(65) Prior Publication Data
US 2019/0173095 A1  Jun. 6, 2019

Related U.S. Application Data

(63) Continuation of application No. PCT/KR2018/003077, filed on Mar. 16, 2018.

(30) Foreign Application Priority Data

Mar. 16, 2017 (KR) .................. 10-2017-0033414
Mar. 15, 2018 (KR) .................. 10-2018-0030410

(51) Int. Cl.
*H01M 4/76* (2006.01)
*H01M 4/38* (2006.01)
(Continued)

(52) U.S. Cl.
CPC ............. *H01M 4/76* (2013.01); *H01M 4/134* (2013.01); *H01M 4/38* (2013.01); *H01M 4/382* (2013.01);
(Continued)

(58) Field of Classification Search
None
See application file for complete search history.

(56) References Cited

U.S. PATENT DOCUMENTS

| 2009/0117468 A1* | 5/2009 | Eom ...................... H01M 4/587 429/231.8 |
| 2010/0004121 A1 | 1/2010 | Chang et al. |

(Continued)

FOREIGN PATENT DOCUMENTS

| CN | 101521273 A | 9/2009 |
| CN | 103022451 A | 4/2013 |

(Continued)

OTHER PUBLICATIONS

English translation of JPH 0945312 (Year: 1997).*
(Continued)

*Primary Examiner* — Yoshitoshi Takeuchi
(74) *Attorney, Agent, or Firm* — Birch, Stewart, Kolasch & Birch, LLP (57) ABSTRACT

A structure, and more specifically a tube-shaped structure having an inner surface and two ends, wherein one or both ends are open and the inner surface is exposed through said one or both open ends, and a metal provide on the inner surface. Also, an electrode active material, such as lithium metal, on the metal included on the inner surface of the tube.

16 Claims, 9 Drawing Sheets

(51) Int. Cl.
  *H01M 4/134* (2010.01)
  *H01M 4/66* (2006.01)
  *H01M 10/0525* (2010.01)

(52) U.S. Cl.
  CPC .......... *H01M 4/661* (2013.01); *H01M 4/663* (2013.01); *H01M 4/664* (2013.01); *H01M 4/666* (2013.01); *H01M 4/765* (2013.01); *H01M 10/0525* (2013.01); *H01M 2220/20* (2013.01); *Y02E 60/10* (2013.01); *Y02T 10/70* (2013.01)

(56) References Cited

U.S. PATENT DOCUMENTS

| | | |
|---|---|---|
| 2011/0076565 A1 | 3/2011 | Cho et al. |
| 2011/0123852 A1 | 5/2011 | Srinivasan et al. |
| 2011/0165465 A1 | 7/2011 | Kim et al. |
| 2013/0034794 A1* | 2/2013 | Liu .................... H01M 4/8626 429/480 |
| 2013/0065128 A1 | 3/2013 | Li et al. |
| 2013/0130124 A1 | 5/2013 | Fukunaga et al. |
| 2014/0315089 A1 | 10/2014 | Yu et al. |
| 2015/0056513 A1 | 2/2015 | Fray et al. |
| 2015/0099185 A1 | 4/2015 | Joo et al. |
| 2017/0104209 A1 | 4/2017 | Son et al. |

FOREIGN PATENT DOCUMENTS

| | | | |
|---|---|---|---|
| CN | 103098293 A | 5/2013 | |
| CN | 103676097 A | 6/2014 | |
| CN | 104112847 A | 10/2014 | |
| CN | 104321909 A | 1/2015 | |
| CN | 106415893 A | 2/2017 | |
| DE | 102015054413 A1 | 10/2015 | |
| JP | H 0945312 * | 2/1997 | .............. H01M 4/02 |
| JP | 2005-174755 A | 6/2005 | |
| JP | 2005174755 * | 6/2005 | ............ B01J 123/42 |
| JP | 2005-194184 A | 7/2005 | |
| JP | 2006-334527 A | 12/2006 | |
| JP | 2014-39910 A | 3/2014 | |
| JP | 5919138 B2 | 5/2016 | |
| KR | 10-1155909 B1 | 6/2012 | |
| KR | 10-1159226 B1 | 6/2012 | |
| KR | 10-2014-0138806 A | 12/2014 | |
| KR | 10-1477782 B1 | 12/2014 | |
| KR | 10-2015-0092980 A | 8/2015 | |
| KR | 10-2015-0092980 A | 3/2016 | |
| KR | 10-2016-0064899 A | 6/2016 | |
| KR | 10-2016-0089954 A | 7/2016 | |
| KR | 10-1666871 B1 | 10/2016 | |
| WO | WO 2013/130690 A9 | 9/2013 | |

OTHER PUBLICATIONS

Yan et al, Selective Deposition and Stable Encapsulation of Lithium Through Heterogeneous Seeded Growth, vol. 1 Nature Energy (Year: 2016).*
English translation of JP 2005/174755 (Year: 2005).*
International Search Report issued in PCT/KR2018/003077 (PCT/ISA/210), dated Jul. 30, 2018.
Lin et al., "Reviving the lithium metal anode for high-energy batteries", Nature Nanotechnology, vol. 12, Mar. 2017, pp. 194-206.
Park et al., "Coaxial Electrospinning of Self-Healing Coatings", Advanced Materials, vol. 22, 2010, pp. 496-499.
Yan et al., "Selective deposition and stable encapsulation of lithium through heterogeneous seeded growth", Nature Energy, vol. 1, Mar. 2016, pp. 1-8.
European Search Report for Appl. No. 18767599.6 dated Sep. 25, 2019.
Hertzberg et al., "Deformations in Si—Li Anodes Upon Electrochemical Alloying in Nano-Confined Space," J. Am. Chem. Soc., vol. 132, No. 25. 2010 (Published on Web Aug. 6, 2010), pp. 8548-8549.

* cited by examiner

TUBE STRUCTURE HAVING METAL ON INNER SURFACE THEREOF

CROSS REFERENCE TO RELATED APPLICATIONS

This application is a Continuation of PCT International Application No. PCT/KR2018/003077, filed on Mar. 16, 2018, which claims priority under 35 U.S.C. 119(a) to Patent Application Nos. 10-2017-0033414, filed in the Republic of Korea on Mar. 16, 2017 and 10-2018-0030410, filed in the Republic of Korea on Mar. 15, 2018, all of which are hereby expressly incorporated by reference into the present application.

TECHNICAL FIELD

The present invention relates to a structure capable of being used for supporting an electrode active material as well as a method of preparing the same.

BACKGROUND ART

With recent developments in the electronics industry, electronic devices have become smaller and lighter, and the use of portable electronic devices has increased therefrom. The necessity of secondary batteries having high energy density has increased as a power supply of such portable electronic devices and studies on lithium secondary batteries have been actively ongoing. With this, lithium ion batteries used as a battery for electric vehicles have been employed in vehicles for a short distance drive due to its physical limits (maximum energy density ~250 Wh/kg).

Lithium metal has a high theoretical capacity of 3,862 mAh/g, and a low standard electrode potential (−3.04 vs SHE), which makes it an ideal material as a negative electrode of high energy density lithium secondary batteries. However, lithium metal has not been commercialized as a negative electrode material of lithium batteries due to safety problems occurring from internal short circuit of the batteries caused by lithium dendrite growth and the like. In addition, lithium metal produces a side reaction with an active material or an electrolyte greatly affecting short circuits and lifespan of batteries. Accordingly, lithium metal electrode stabilization and dendrite suppression technologies are core technologies that need to precede the development of next-generation lithium secondary batteries.

Various-formed electrode active materials have been continuously studied for suppressing such lithium metal dendrite growth and preventing a reaction between lithium metal and a liquid electrolyte.

For example, a negative electrode active material in which Au is deposited on an inner surface of a cavity-shaped capsule, and with the Au as a seed, inside the cavity-shaped capsule is filled with lithium metal has been developed (Nature Energy 1, Article number: 16010 (2016), "Selective deposition and stable encapsulation of lithium through heterogeneous seeded growth"). The cavity-shaped capsule-formed negative electrode active material is capable of securing stability in a liquid electrolyte due to its closed shape, however, the volume of lithium metal filling inside the cavity-shaped capsule is not readily controlled, and a problem of reducing electrical conductivity may occur when forming an electrode due to its spherical shape.

In view of the above, development of active materials having a form of readily controlling an electrode active material amount depending on battery capacity while preventing lithium metal dendrite formation and a reaction between lithium metal and a liquid electrolyte has been required.

Prior Art Documents
Patent Documents
(Patent Document 001) Korean Patent No. 1155909, "negative electrode active material for lithium secondary battery, method for manufacturing the same and lithium secondary battery including the same"
Non-Patent Documents
(Non-Patent Document 001) Yan, et al., Nature Energy 1, Article number: 16010 (2016), "Selective deposition and stable encapsulation of lithium through heterogeneous seeded growth"

DISCLOSURE

Technical Problem

As a result of extensive studies in view of the above, one embodiment of the present invention relates to a structure capable of supporting an electrode active material, such structure having a tube having an inner surface forming a cavity in the tube and two ends, wherein one or both ends are open, and a metal, for instance a metal having favorable reactivity with an electrode active material, is formed on the inner surface of the tube. The inventors have identified that such a structure is capable of preventing a phenomenon of the electrode active material supported therein from growing to a dendrite form, and enhancing battery stability by blocking a reaction between the electrode active material and a liquid electrolyte.

Accordingly, one embodiment of the present invention is to provide a structure having a shape capable of enhancing battery safety by supporting an electrode active material.

Technical Solution

In view of the above, one embodiment of the present invention provides a structure including a tube having an inner surface forming a cavity and two ends, wherein one or both ends are open; and a metal on the inner surface of the tube.

In one embodiment of the structure, an aspect ratio (a) of a longitudinal section of the tube calculated by the following Equation 1 may be more than 1.

$$a = L/D_{ex} \quad \text{[Equation 1]}$$

Herein, L is a length of the tube and $D_{ex}$ is an outer diameter of the tube.

Another embodiment of the present invention provides a structure including a tube having an inner surface forming a cavity and two ends, wherein one or both ends are open; a metal on the inner surface of the tube; and lithium metal formed on the metal.

Another embodiment of the present invention relates to a method for preparing a structure, including: (S1) forming a tube precursor by electric radiating a metal precursor solution and a carbon-based polymer solution; (S2) first heat treating the tube precursor; and (S3) second heat treating the first heat treated tube precursor. In another embodiment, this method may further include (S4) forming lithium metal inside the tube obtained in (S3).

Advantageous Effects

In one embodiment of a structure according to the present invention, a metal on an inner surface of a tube included in the structure may be capable of preventing an electrode active material from growing in a dendrite form by being formed around the metal, and may also be capable of enhancing battery safety by preventing a reaction with a liquid electrolyte.

Specifically, the structure may be used as a negative electrode active material having lithium metal supported therein.

In addition, the tube-shaped structure may have a shape of both ends open, and may have a more advantageous effect in terms of securing an electrical conduction pathway.

Furthermore, the structure may be a tube-shaped structure having an aspect ratio of more than 1, and the tube shape itself having an aspect ratio of more than 1 can be an electrical conduction pathway.

MODE FOR DISCLOSURE

Hereinafter, the present invention will be described in more detail for illuminating the present invention.

Terms or words used in the present specification and the claims are not to be interpreted limitedly to common or dictionary meanings, and shall be interpreted as meanings and concepts corresponding to technological ideas of the present invention based on a principle in which inventors may suitably define the concepts of terms in order to describe their own invention in the best possible way.
Structure (1)

One embodiment of present invention relates to a structure capable of supporting an electrode active material, and for example, relates to a structure capable of, when the structure supports lithium metal as a negative electrode active material, preventing a direct reaction between the lithium metal and a liquid electrolyte and preventing the lithium metal from growing in a dendrite form in a negative electrode of a lithium metal battery.

Hereinafter, the present invention will be described in more detail with reference to the accompanying drawings.

Figure 1A:
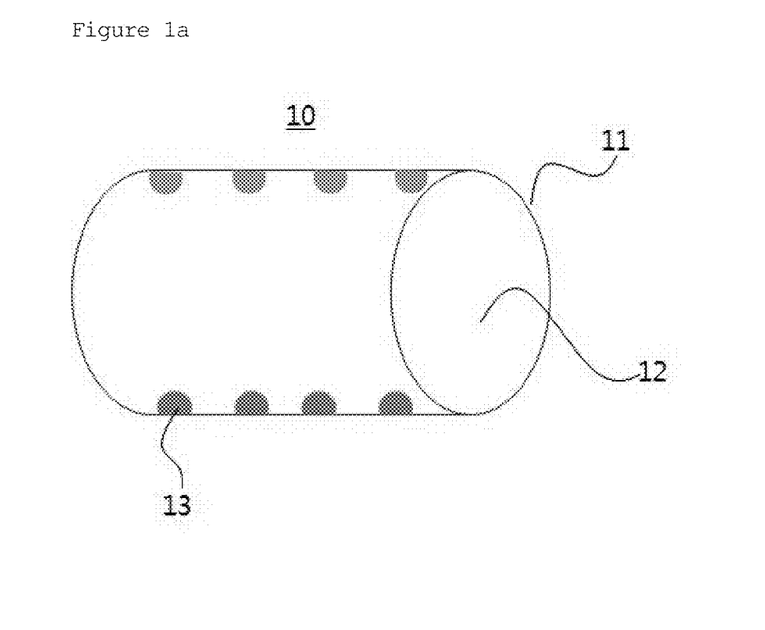
FIGS. 1a and 1b are mimetic diagrams of a structure according to embodiments of the present invention (FIG. 1a: the structure before lithium metal is supported, FIG. 1b: the structure after lithium metal is supported).
Figure 1B:
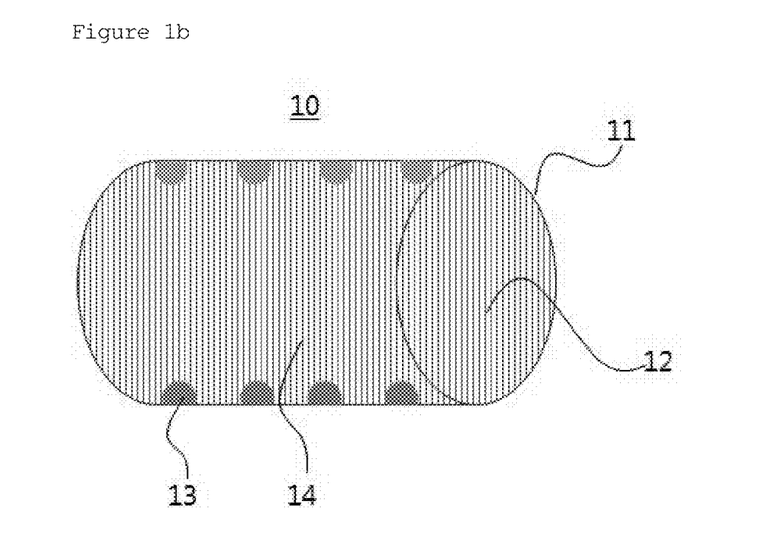

FIGS. 1a and 1b are mimetic diagrams of a structure according to one embodiment of the present invention.

When referring to FIG. 1a, the structure (10) may include a tube (11) having both ends (12) (one shown) open; and a metal (13) formed on an inner surface of the tube (11). In FIG. 1b, there is additionally a lithium metal (14) formed on the metal (13).

Figure 2A:
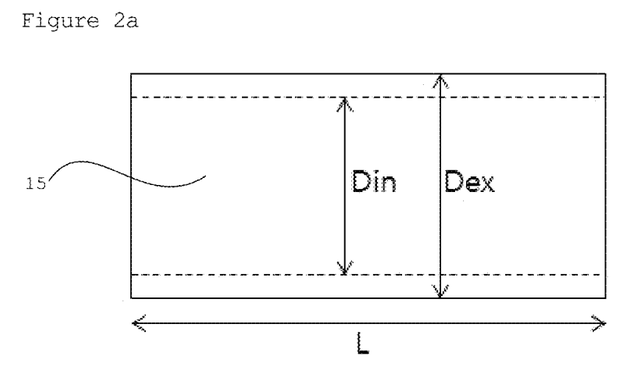
FIGS. 2a and 2b are respectively mimetic diagrams illustrating a longitudinal section and a transverse section of a tube in a structure according to one embodiment of the present invention.
Figure 2B:
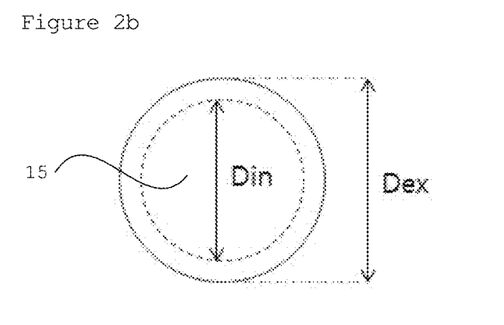

FIGS. 2a and 2b are respectively mimetic diagrams illustrating a longitudinal section (FIG. 2(a)) and a transverse section (FIG. 2(b)) of the tube in the structure according to one embodiment of the present invention. Defined within the tube is a cavity (15).

When referring to FIGS. 2a and 2b, an aspect ratio (a) of the longitudinal section of the tube (11) may be more than 1.

Herein, the aspect ratio of the longitudinal section of the tube (11) may be calculated by the following Equation 1.

$$a = L/D_{ex} \quad \text{[Equation 1]}$$

Herein, L is a length of the tube (11) and $D_{ex}$ is an outer diameter of the tube (11).

For example, in one embodiment the length of the tube (11) may be 2 μm to 25 μm, preferably 3 μm to 15 μm, and more preferably 4 μm to 10 μm. When the length of the tube is less than 2 μm, it may be difficult to implement the tube having an aspect ratio more than 1 by Equation 1. In addition, when the length of the tube is more than 25 μm, there may be a problem that the packing density is low and the pores of the electrode become large even after rolling, so that the energy density per cell volume becomes low.

In one embodiment the outer diameter ($D_{ex}$) of the tube (11) may be 0.2 μm to 2 μm, preferably 0.3 μm to 1.2 μm, more preferably 0.5 μm to 1 μm. When the outer diameter is less than 0.2 μm, the volume of the lithium metal (14) contained in the structure (10) is reduced, so that the lithium dendrite inhibiting effect and battery cycle lives are reduced and the specific capacity of the active material and the energy density per weight of the battery become lower. When the outer diameter is more than 2 μm, it is difficult to maintain the shape of the tube in the manufacturing process and the tube shape may be broken even during the electrode manufacturing and rolling processes, so that the lithium dendrite inhibiting effect is lowered.

The actual dimensions of the tube (11), such as length L, outer diameter $D_{ex}$ and inner diameter $D_{in}$, may be measured with SEM (scanning electron microscope) or TEM (transmission electron microscope).

The structure (10) has a tube (11) shape having an aspect ratio of more than 1 (a>1) as described above and the tube (11) may include a carbon-based polymer, and therefore, the structure (10) itself may function as an electrical conduction pathway.

In addition, the tube (11) has a cylindrical shape having one or both ends open, and the tube itself may become an electrical conduction pathway, and ion conductivity may be enhanced by liquid electrolyte wetting.

When a structure is a hollow type capsule having a sphere shape, the sphere has a closed shape, and thus, it is difficult to impregnate electrolyte liquid compared to a tube shape, to transfer lithium ions into the structure and to control the volume of the lithium metal filled on its inside. In addition, when forming an electrode, its electrical conductivity may decrease due to its sphere shape.

A shell of the tube (11) may exhibit electrical conductivity, and may also exhibit lithium ion conductivity.

Herein, the shell of the tube (11) may include carbon, and the carbon may be amorphous carbon.

In addition, the tube (11), and in particular the shell of the tube (11), may be porous. When the outer diameter of the tube increases, the thickness of the shell will increase to reinforce the strength. At this time, if there is a pore in the shell, the electrolyte can penetrate into the shell, so that the resistance of the battery may be reduced. The size of the pores may range from 2 nm to 200 nm, and it is preferred to have a porosity of 0% to 50% for maintaining the strength of the tube.

Meanwhile, the metal (13) may be included in a shape of being formed on an inner surface of the tube (11), and the metal (13) may be included in 0.1% by weight to 25% by weight, preferably 0.1% by weight to 15% by weight and more preferably 0.5% by weight to 10% by weight based on the total weight of the structure (10), that is, the total weight of the tube (11) and the metal (13).

When the weight of the metal (13) is less than 0.1% by weight, sites for an electrode active material to bind may not be sufficient, and when the weight is more than 25% by weight, the amount of the metal (13) may become excessive resulting in a relative decrease in the amount of an electrode active material to fill, and as a result, the specific capacity of the electrode active material may decrease.

The metal (13) may be formed on an inner surface of the tube (11) in a particle form, and the metal (13) may be a particle having a particle diameter of 1 nm to 50 nm, preferably 5 nm to 40 nm, and more preferably 10 nm to 30 nm. When the metal (13) has a particle diameter of less than 1 nm, areas for an electrode active material to bind may not be sufficient, which may not induce smooth growth of the electrode active material, and when the particle diameter is more than 50 nm, areas for metal (13) formation increase, thus, decreasing the specific capacity of the electrode active material.

In the present invention, the tube (11) may be suitable for supporting an electrode active material.

The electrode active material may be a positive electrode active material or a negative electrode active material commonly used.

The positive electrode active material may be an oxide formed with lithium and a transition metal having a structure capable of lithium intercalation, and for example, may be represented by the following Chemical Formula 1.

$$Li_aNi_{1-x-y}Co_xMn_yM_bO_2 \quad \text{[Chemical Formula 1]}$$

In Chemical Formula 1, a=1, 0.1≤x≤0.3, 0.15≤y≤0.25 and 0≤b≤0.05, and M may be any one selected from among transition metals or lanthanide elements, for instance, selected from the group consisting of Al, Cr, Mn, Fe, Mg, La, Ce, Sr, V, Zn and combinations thereof.

Typical examples of the negative electrode active material may include graphite-based carbon, amorphous carbon such as non-graphitized carbon, crystalline carbon and the like, and may also use metal composite oxides such as $Li_xFe_2O_3$ (0≤x≤1), $Li_xWO_2$ (0≤x≤1) and $Sn_xMe_{1-x}Me'_yO_z$ (Me: Mn, Fe, Pb, Ge; Me': Al, B, P, Si, elements of group 1, group 2 and group 3 in the periodic table, halogen; 0≤x≤1; 1≤y≤3; 1≤z≤8); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials and the like, however, the material is not limited thereto, and negative electrode active materials commonly used may be used without limit. The metal (13) may be a metal having a low overvoltage with an electrode active material compared to an electrode current collector; or a metal having a multi-phase with an electrode active material.

For example, when the electrode active material is lithium metal, the metal having a low overvoltage compared to Cu (current collector) when forming the lithium metal may be one or more types selected from the group consisting of Au, Zn, Mg, Ag, Al, Pt, In, Co, Ni, Mn and Si as a metal having a low interfacial energy when reacting with the lithium metal, and the metal having a multiphase with the lithium metal may be Ca as a metal having a plurality of sites capable of reacting with the lithium metal.

In addition, the tube (11) may include a semiconductor element and an oxide of the semiconductor element.

The oxide of the semiconductor element may include oxides of group 14 semiconductor elements except carbon. The oxide of the semiconductor element may include oxides of a Si, Ge or Sn element.

The oxide of the semiconductor element may include $SiO_x$ (herein, 0.3≤x≤1.2), $GeO_y$ (herein, 0.2≤y≤1.1), $SnO_z$ (herein, 0.3≤z≤1.2) or combinations thereof, and for example, the oxide of the semiconductor element may be $SiO_x$ (herein, 0.3≤x≤1.2) or $GeO_y$ (herein, 0.2≤y≤1.1).

Structure (2)

Another embodiment of relates to a structure capable of enhancing battery safety by supporting an electrode active material, and for example, may, when the structure supports lithium metal as a negative electrode active material, prevent a direct reaction between the lithium metal and a liquid electrolyte while preventing the lithium metal from growing in a dendrite form in a negative electrode of a lithium metal battery.

Such embodiment relates to a structure (10) including a tube (11) having an inner surface forming a cavity and two ends, wherein one or both ends are open; a metal (13) on the inner surface of the tube (11); and lithium metal (14) formed on the metal (13) (see, illustratively, FIG. 1b).

In the case of a lithium dendrite, the cycle efficiency is not good, because even if the lithium dendrite is suppressed, side reactions of the lithium dendrite with the electrolytic solution occur. Therefore, in the development of a battery with a long life, for instance, of 500 cycles or more, it may be more advantageous to apply the structure (10) including the metal (14) to a negative electrode of a lithium metal battery as compared to the structure (10) not including the metal (14).

Detailed descriptions on an aspect ratio of the tube, physical properties of the tube exhibiting electrical conductivity and lithium ion conductivity, materials of a shell and a core, a composition and the metal are as described above.

At an interface between the metal (13) and the lithium metal (14), an alloy of the metal (13) and the lithium metal (14) may be formed. The alloy may be $Li_xAu$, and herein, x may be a real number of 0<x≤3.75.

Meanwhile, a cavity (15, shown in FIGS. 2a and 2b) inside the tube (11) including the metal (13) may be filled with the lithium metal (14).

The lithium metal (14) may fill up inside the cavity (15) while growing through bonding to the metal (13), and a volume of the lithium metal (14) filling inside the cavity (15) may be calculated by the following Equation 2 using a volume ratio (α) of the lithium metal with respect to a free volume of the tube (11), which is 0<α≤1.

$$\alpha = V_{Li}/V_F \quad \text{[Equation 2]}$$

In Equation 2, $V_F$ is a free volume of the tube and $V_{Li}$ is a volume of the lithium metal, and the $V_F$ is calculated by the following Equation 3:

$$V_F = \pi(D_{in}/2)^2 L \quad \text{[Equation 3]}$$

In Equation 3, $D_{in}$ is an inner diameter of the tube and L is a length of the tube.

As the a value increases in the 0<α≤1 range, a volume of the lithium metal included in the structure (10) increases, and accordingly, a cycle life of a battery may be enhanced.

For example, in one embodiment, the length of the tube (11) may be 2 μm to 25 μm, preferably 3 μm to 15 μm, and more preferably 4 μm to 10 μm. When the length of the tube is less than 2 μm, it may be difficult to implement the tube having an aspect ratio more than 1 by Equation 1. In addition, when the length of the tube is more than 25 μm, there may be a problem that the packing density is low and the pores of the electrode become large even after rolling, so that the energy density per cell volume becomes low.

In one embodiment, the inner diameter ($D_{in}$) of the tube (11) may be 0.1 μm to 1.8 μm, preferably 0.2 μm to 1.1 μm, more preferably 0.4 μm to 0.9 μm. When the inner diameter is less than 0.1 μm, the volume of the lithium metal (14) contained in the structure (10) may be reduced, so that the lithium dendrite inhibiting effect and battery cycle lives are reduced and the specific capacity of the active material and the energy density per weight of the battery become lower. When the inner diameter is more than 1.8 μm, it is difficult to maintain the shape of the tube in the manufacturing process and the tube shape may be broken even during the electrode manufacturing and rolling processes, so that the lithium dendrite inhibiting effect is lowered.

Method for Preparing Structure

Figure 7:
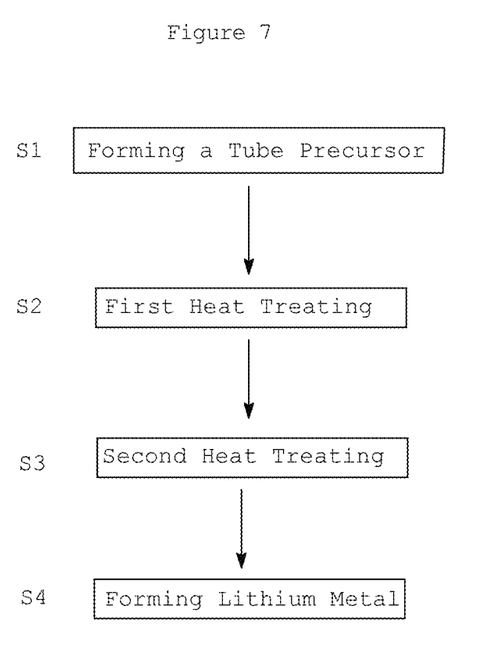
FIG. 7 is a flowchart representing a method according to one embodiment of the present invention.

As shown in FIG. 7, one embodiment of the present invention relates to a method for preparing a structure including (S1) forming a tube precursor by electric radiating a metal precursor solution and a carbon-based polymer solution; (S2) first heat treating the tube precursor; and (S3) second heat treating the first heat treated tube precursor, and the method may optionally further include (S4) forming lithium metal inside the tube obtained in (S3).

In the method for preparing a structure according to one embodiment of the present invention, temperatures of the first heat treatment and the second heat treatment are all different, and the second heat treating temperature may be relatively higher than the first heat treating temperature.

Hereinafter, the method for preparing a structure according to one embodiment of the present invention will be described in detail for each step.

In the step (S1), a tube precursor may be formed by electric radiating a metal precursor solution and a carbon-based polymer solution.

Electric radiation may be carried out through an electric radiation method using a dual nozzle including inner side and outer side nozzles, and may be carried out in a voltage range of 10 kV to 20 kV and a tip to collector distance (TCD) of 5 cm to 20 cm with steel use stainless (SUS) as a collector using a high pressure electric radiator.

Figure 3:
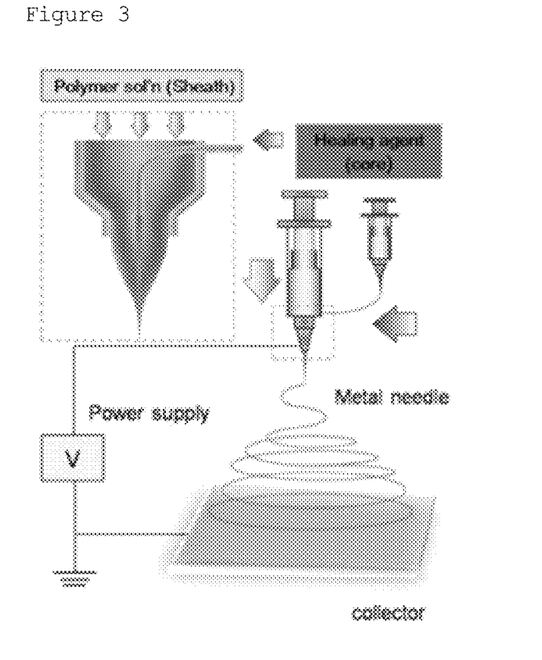
FIG. 3 is a mimetic diagram of a dual-nozzle system as an electric radiation device used in preparing a structure according to one embodiment of the present invention.

The electric radiation may use electric radiation methods commonly used in the art. For example, a dual-nozzle system illustrated in FIG. 3 (Adv. Mater., 2010, 22, 496, herein incorporated by reference) may be used.

A core-shell-shaped tube precursor may be formed by injecting the metal precursor solution and the carbon-based polymer solution to the inner side and the outer side nozzles, respectively, and electric radiating.

The metal precursor solution may be prepared by dissolving a metal precursor and a polymer in a solvent.

Herein, the metal precursor solution may include the metal precursor in 0.1% by weight to 5% by weight, the polymer in 1% by weight to 20% by weight and the solvent in 75% by weight to 95% by weight based upon the total weight of the metal precursor solution.

The metal precursor may be one or more types selected from the group consisting of metal-including alkoxides, acetyl acetates, nitrates, oxalates, halides and cyanides, and specifically, the metal may be one or more types selected from the group consisting of Au, Zn, Mg, Ag, Al, Pt, In, Co, Ni, Mn, Si and Ca.

In addition, when the metal is Au, the precursor of Au may be one or more types selected from the group consisting of $HAuCl_4$, $HAuCl_4 \cdot 3H_2O$, $HAuCl_4 \cdot 4H_2O$, $AuCl_3$ and AuCl.

When the metal precursor is included in less than 0.1% by weight, the metal performing a role of a seed metal for lithium metal growth may not be sufficiently formed inside the structure, and inside the tube may not be filled with lithium metal to a target level, and when the content is more than 5% by weight, the amount of the formed metal increases with respect to the total weight of the structure, which may relatively reduce the amount of the lithium metal formed inside the structure, and as a result, a cycle life property of a battery may decline.

In addition, the polymer may be one or more types selected from the group consisting of polymethyl methacrylate (PMMA), polyvinyl pyrrolidone (PVP), polyvinyl acetate (PVAc), polyvinyl alcohol (PVA), polystyrene (PS) and polyvinylidene fluoride (PVDF), and polymers capable of being removed at a carbonizing temperature of a carbon-based polymer may be widely used normally.

When the polymer is included in less than 1% by weight, forming tube precursor using electric radiation is difficult, and when the content is more than 20% by weight, the polymer remains without being sufficiently removed in the first heat treatment thereby declining battery performance.

The solvent may be one or more types selected from the group consisting of methylpyrrolidone (NMP), dimethylformamide (DMF), dimethylacetamide (DMAc), dimethyl sulfoxide (DMSO), tetrahydrofuran (THF) and mixtures thereof.

When the solvent is included in less than 75% by weight, the metal precursor solution may be difficult to prepare, and when the content is more than 95% by weight, the amounts of the metal precursor and the polymer relatively decrease making it difficult to form the metal inside the structure to a target level.

The carbon-based polymer solution may be prepared by dissolving a carbon-based polymer in a solvent.

The carbon-based polymer may be one or more types selected from the group consisting of polyacrylonitrile (PAN), polyaniline (PANI), polypyrrole (PPY), polyimide (PI), polybenzimidazole (PBI), polypyrrolidone (Ppy), polyamide (PA), polyamide-imide (PAI), polyaramide, melamine, melamineformaldehyde and fluorine mica. Meanwhile, a density of the carbon included in the tube may be from 2.0 $g/cm^3$ to 2.5 $g/cm^3$.

The carbon-based polymer solution may be prepared by dissolving 1% by weight to 20% by weight of the carbon-based polymer in 80% by weight to 99% by weight of the solvent based upon the total weight of the carbon-based polymer solution.

When the carbon-based polymer is included in less than 1% by weight, the weight of the carbon-based polymer may not be sufficient to form the tube and the tube may not be formed after electric radiation, and when the content is more than 20% by weight, the concentration of the carbon-based polymer solution may be excessively high and electric radiation may not be smoothly progressed.

When the solvent is included in less than 80% by weight, the concentration of the carbon-based polymer solution may be excessively high and electric radiation may not be smoothly progressed, and when the content is more than 99% by weight, a tube form may not be formed after electric radiation.

The solvent used in preparing the metal precursor solution and the carbon-based polymer solution may be the same as or different from each other.

In the step (S2), the tube precursor is first heat treated through heating, and the polymer included in the core of the tube precursor may be removed.

Herein, the heating temperature of the first heat treatment may be from 200° C. to 700° C., and the heat treatment may be carried out while raising a temperature. A metal may be formed by the polymer included in the core of the tube precursor being removed and the metal precursor being reduced while raising a temperature in the first heat treatment.

When the temperature of the first heat treatment is lower than 200° C., the polymer included in the core of the tube precursor may not be removed and the metal precursor may not be reduced as well, and when the temperature is higher than 700° C., a problem of a metal being formed not only on an inner surface of the tube but on an outer surface of the tube may occur.

A metal is formed on an inner surface of the tube through a reduction reaction by the heat treatment, and the metal may have a particle form with nano-sized particle sizes of 1 nm to 50 nm.

Meanwhile, the first heat treatment may be carried out under inert atmosphere, and specifically, the inert atmosphere may be formed by one or more types of inert gases selected from the group consisting of Ar, $N_2$, He, Ne and Ne.

In the step (S3), the first heat treated tube precursor is second heat treated through heating, and the shell of the tube precursor may be carbonized to form a tube structure including carbon.

Herein, the heating temperature of the second heat treatment may be higher than 700° C. and lower than or equal to and 1000° C. When the second heat treating temperature is 700° C. or lower, carbonization may not completely occur, and when the temperature is higher than 1000° C., physical properties of the formed tube structure may decline due to high temperature treatment.

Particularly, in the second heat treatment, pores controlled in size can be formed in the tube shell at a heating temperature of about 800° C. within a heating temperature range of 700 to 1000° C. For example, in the heating temperature range during the second heat treatment, the pores become smaller as the temperature is higher than 800° C. and the pores become larger as the heating temperature is lower than 800° C. Therefore, the pore size can be controlled by controlling the heating temperature within the heating temperature range.

In the step (S4), lithium metal may be formed inside the tube structure.

A method of forming lithium metal inside the tube structure may use one type of method selected from the group consisting of electroplating, electroless plating and deposition, however, the method is not limited thereto, and methods capable of forming lithium metal inside the tube structure and filling the tube structure with the lithium metal may be widely used.

A lithium source for forming the lithium metal may be one or more types selected from the group consisting of lithium salts, lithium ingot and lithium metal oxides, but is not limited thereto as long as it is a compound capable of providing lithium ions.

The lithium salt may be one or more types selected from the group consisting of $LiPF_6$, $LiClO_4$, $LiAsF_6$, $LiBF_4$, $LiSbF_6$, $LiAlO_4$ $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(CaF_{2a+1}SO_2)(CbF_{2b+1}SO_2)$ (wherein a and b are natural numbers, and preferably $1 \leq a \leq 20$ and $1 \leq b \leq 20$), LiCl, LiI and $LiB(C_2O_4)_2$.

The lithium metal oxide may be one or more types selected from the group consisting of $LiMO_2$ (M=Co, Ni, Mn), $Li_{1+x}Mn_{2-x}O_4^+$ ($0 \leq x \leq 0.3$) and $LiNi_{1-x}M_xO_2$ (M=Co, Mn, Al, Cu, Fe, Mg, B or Ga, and $0.01 \leq x \leq 0.3$). For example, the lithium metal oxide may be $LiCoO_2$, $LiNiO_2$, $LiMn_2O_4$, $Li(Ni_aMn_bCo_c)O_2$ (a+b+c=1), $LiNi_{0.5}Mn_{1.5}O_4$ or $LiNi_{0.5}Mn_{0.5}O_2$.

The lithium metal-supported structure prepared as above may be used as a negative electrode active material of a lithium metal battery, and may be capable of solving problems of lithium metal dendrite formation, a chronic problem of existing lithium metal batteries, and interfacial instability caused therefrom.

MODE FOR INVENTION

Hereinafter, preferred examples are provided for illuminating the present invention, however, the following examples are for illustrative purposes only, and it is obvious to those skilled in the art that various changes and modifications may be made within the scope and technological ideas of the present invention, and such changes and modifications also belong to the scope of the appended claims.

Example 1

Preparation of Structure 1-1. Tube Precursor Formation by Electric Radiation

A metal precursor solution was prepared by dissolving 0.5% by weight of $HAuCl_4$ (a metal precursor), 11% by weight of PMMA (a polymer), in 88.5% by weight of a solvent. Herein, as the solvent, a mixed solvent mixing dimethylformamide (DMF) and acetone in a weight ratio of 85:15 was used.

A carbon-based polymer solution was prepared by dissolving 13% by weight of PAN (a carbon-based polymer), in 87% by weight of dimethylformamide (DMF) (a solvent).

The metal precursor solution and the carbon-based polymer solution were introduced to an inner nozzle and an outer nozzle, respectively, of a dual-nozzle system including an inner nozzle and an outer nozzle (Adv. Mater., 2010, 22, 496, herein incorporated by reference), and electric radiated to form a tube precursor.

The condition during electric radiation was set as follows.

Relative humidity: 15%

Electric radiating power: 14.5 kV

Radiating solution output (flow rate)

core=0.9 mL/h (1.3/2 ratio), shell=1.4 mL/h 1-2. First Heat Treatment and Reduction The tube precursor was heat treated in a 280° C. furnace to remove PMMA included in a core of the tube precursor, and the temperature was raised to reduce $HAuCl_4$ and form Au particles on an inner surface of the tube precursor shell.

1-3. Second Heat Treatment and Carbonization

After that, PAN of the tube precursor was carbonized at 850° C. to form a tube structure having Au formed on the inner surface thereof.

Example 2

Preparation of Lithium Metal-Formed Structure

Lithium metal was formed inside the tube structure having Au formed on the inner surface of Example 1 through electroplating. Herein, $LiClO_4$ (a lithium salt) was used as a lithium source.

Herein, the electroplating was carried out by flowing a current on a lithium half-cell manufactured using a method as below with currently density of 1 mA/cm$^2$.

Negative Electrode Preparation

The structure prepared in Example 1, Super-P carbon that is a conductor, and PVdF that is a binder were mixed in a weight ratio of 95:2.5:2.5, then the mixture was coated on a Cu current collector, and the result was dried to prepare a negative electrode.

Liquid Electrolyte

As a liquid electrolyte, a liquid electrolyte dissolving 1 M lithium bis-trifluoromethanesulfonimide (LiTFSI) in a mixed solvent of 1,2-dimethoxyethane (DME) and 1,3-dioxolane (DOL) (volume ratio 1:1), and a 1% $LiNO_3$ liquid electrolyte were mixed and used.

Separator

A polyethylene separator was used as a separator.

A lithium half-cell was manufactured using the prepared negative electrode, the polyethylene separator and the liquid electrolyte.

Comparative Example 1

Bare Cu foil was prepared.

Comparative Example 2

A tube-shaped structure was prepared in the same manner as in Example 1, except that a metal is not included on an inner surface of the tube.

Preparation Example

Manufacture of Lithium Half-Cell

Negative Electrode Preparation

The structure each prepared in Example 1 and Comparative

Example 2, Super-P carbon that is a conductor, and PVdF that is a binder were mixed in a weight ratio of 95:2.5:2.5, then the mixture was coated on a Cu current collector, and the result was dried to prepare a negative electrode.

Liquid Electrolyte

As a liquid electrolyte, a liquid electrolyte dissolving 1 M lithium bis-trifluoromethanesulfonimide (LiTFSI) in a mixed solvent of 1,2-dimethoxyethane (DME) and 1,3-dioxolane (DOL) (volume ratio 1:1), and a 1% $LiNO_3$ liquid electrolyte were mixed and used.

Separator

A polyethylene separator was used as a separator.

A lithium half-cell was manufactured using the prepared negative electrode, the polyethylene separator and the liquid electrolyte.

Test Example 1

Test on Charge and Discharge Property

Charge and discharge were performed on the lithium half-cell prepared in the preparation example using each of the structures of Example 1 and Comparative Example 2, and the Cu current collector of Comparative Example 1. The charge and discharge test was carried out at a current density of 1 mAh/cm$^2$ with a discharge capacity of 1 mAh/cm$^2$, a charging voltage of 1V cut-off.

Figure 4A:
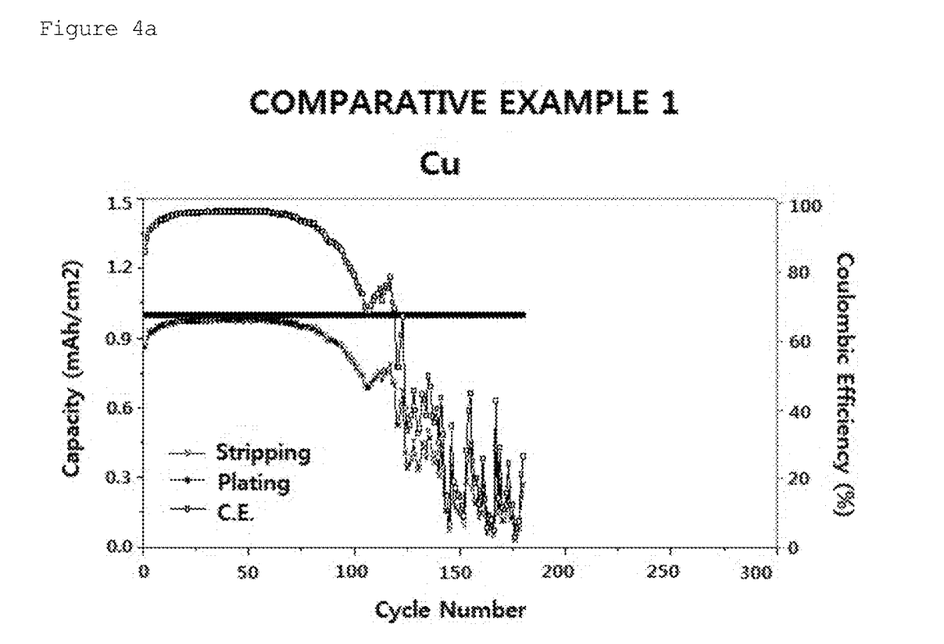
FIGS. 4a to 4c are graphs showing charge and discharge test results for lithium half-cells manufactured using structures of examples and comparative examples of the present invention.
Figure 4B:
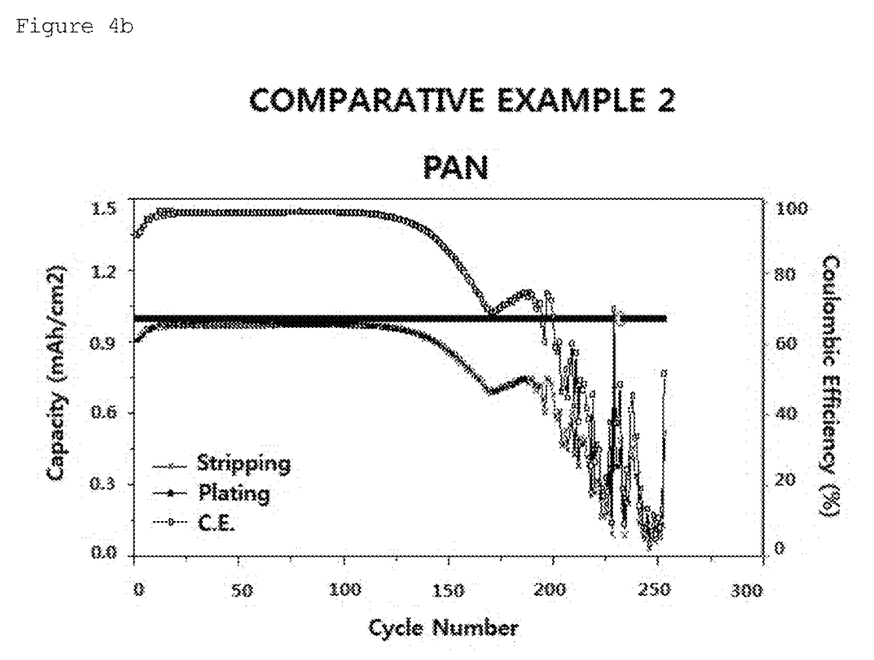
Figure 4C:
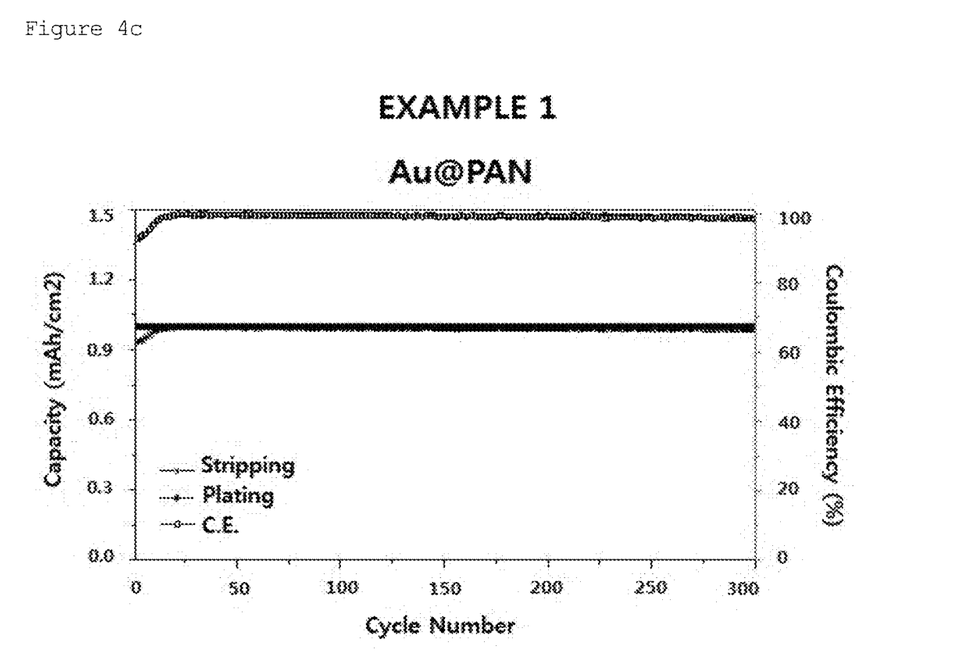

FIGS. 4a to 4c show graphs of charge and discharge test results for the lithium half-cells manufactured using the structures of Example 1 and Comparative Examples 1 and 2.

When referring to FIGS. 4a to 4c, it was seen that the lithium half-cell manufactured using the structure prepared in Example 1 did not exhibit a capacity decrease up to 300 cycles.

Test Example 2

Observation on Form Changes of Structure Depending on Charge and Discharge

Shape changes made by the tube-shaped structure of Example 1 before the charge and discharge property test (pristine) and when charged and discharged in the lithium half-cell of Test Example 1 were observed.

Figure 5:
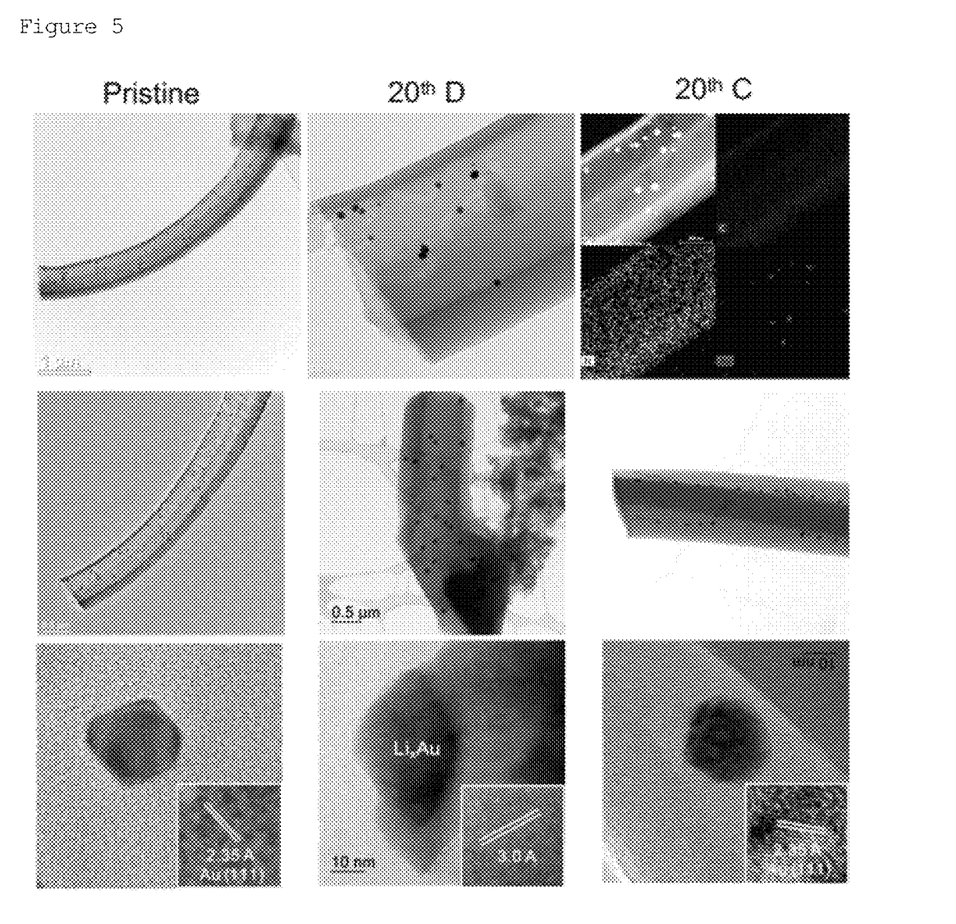
FIG. 5 shows transmission electron microscope (TEM) images observing form changes of a lithium half-cell manufactured using a structure of Example 1 before and after charge and discharge (Pristine: before charge and discharge; $20^{th}$ D: after $20^{th}$ discharge; $20^{th}$ C: after $20^{th}$ charge).

FIG. 5 shows transmission electron microscope (TEM) images observing form changes of the lithium half-cell manufactured using the structure of Example 1 before and after charge and discharge (Pristine: before charge and discharge; 20$^{th}$ D: after 20$^{th}$ discharge; 20$^{th}$ C: after 20$^{th}$ charge).

When referring to FIG. 5, it was seen that Au having particle sizes of 15 nm to 20 nm was uniformly dispersed on the inner surface of the tube of the tube-shaped structure before charge and discharge. In addition, it was seen that lithium metal first bonded to Au inside the tube to form a $Li_xAu$-type alloy (x is a real number of $0<x\leq3.75$) when charged and discharged, and particularly, the lithium metal was only formed inside the tube and escaped after 20$^{th}$ charge and discharge.

Test Example 3

Observation on Form of Lithium Metal Growth

A shape of lithium metal growth was observed after 20$^{th}$ charge in the charge and discharge property test of Test Example 1.

Figure 6:
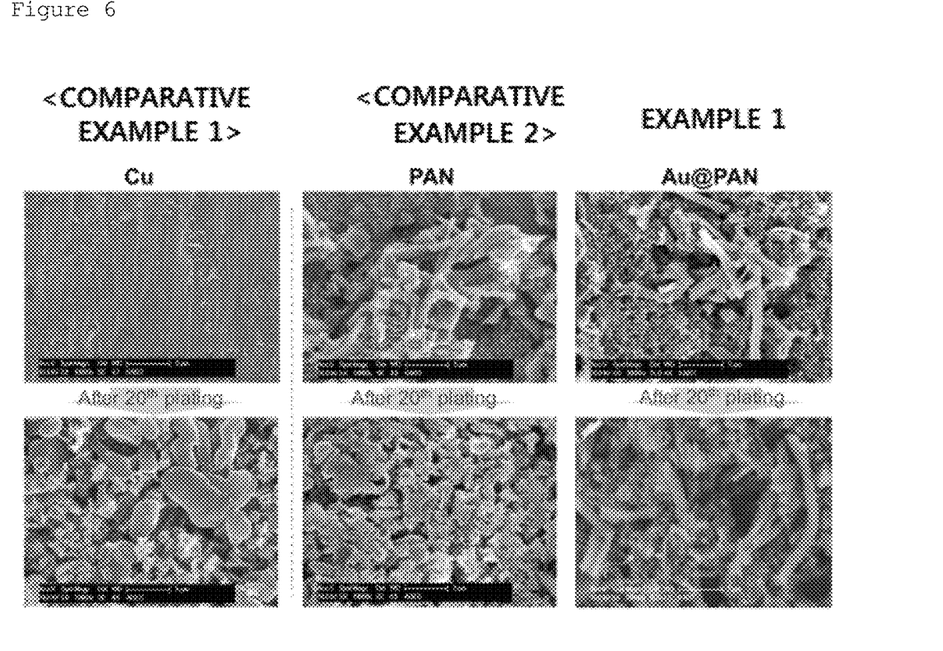
FIG. 6 shows scanning electron microscope (SEM) images observing a form of lithium metal growth when charging lithium half-cells manufactured using structures of examples and comparative examples.

FIG. 6 shows scanning electron microscope (SEM) images observing a form of lithium metal growth when charging and discharging the lithium half-cells manufactured using the structures of Example 1 and Comparative Examples 1 and 2.

When referring to FIG. 6, it was seen that the lithium half-cell manufactured using the structure prepared in Example had reduced lithium metal dendrite formation compared to Comparative Examples 1 and 2 after 20$^{th}$ charge.

Hereinbefore, the present invention has been described with reference to limited embodiments and drawings, however, the present invention is not limited thereto, and various modifications and changes may be made by those having common knowledge in the technology field to which the present invention belongs within technological ideas of the present invention and the scope of equivalents of the appended claims.

REFERENCE NUMERAL

10: Structure
11: Tube
$D_{ex}$: Tube Outer Diameter
$D_{in}$: Tube Inner Diameter
12: End of Tube (tube may be 2 ends)
13: Metal
14: Electrode Active Material
15: Cavity

The invention claimed is:

1. A structure comprising:
a tube having an inner surface forming a cavity and two ends, wherein one or both ends are open;
a metal on the inner surface of the tube; and
lithium metal formed on the metal,
wherein the metal included on the inner surface of the tube is one or more selected from the group consisting of Au, Zn, Ag, Al, Pt, In, Co, Ni, and Mn,
wherein the tube has an inner diameter of 0.1 μm to 1.8 μm, an outer diameter or 0.2 μm to 2 μm, and a length of 2 μm to 25 μm, and
wherein the tube has an aspect ratio (a) of a longitudinal section calculated by Equation 1; and
wherein the aspect ratio (a) is more than 1:

$$a = L/D_{ex} \quad \text{[Equation 1]}$$

in Equation 1, L is the length of the tube and $D_{ex}$ is the outer diameter of the tube.

2. The structure of claim 1, wherein the tube exhibits electrical conductivity.

3. The structure of claim 2, wherein the tube exhibits lithium ion conductivity.

4. The structure of claim 1, wherein the tube comprises carbon.

5. The structure of claim 4, wherein the carbon is amorphous carbon.

6. The structure of claim 1, wherein the tube is porous.

7. The structure of claim 1, wherein the metal is included in an amount of 0.1% by weight to 25% by weight with respect to a total weight of the tube and the metal.

8. The structure of claim 1, wherein the metal is present as a particle that has a particle diameter of 1 nm to 50 nm.

9. The structure of claim 1, wherein the tube is suitable for supporting an electrode active material.

10. The structure of claim 9, wherein the electrode active material is a positive electrode active material or a negative electrode active material.

11. The structure of claim 10, wherein the negative electrode active material comprises a lithium metal.

12. The structure of claim 1, wherein the metal included on the inner surface of the tube is a metal having a lower overvoltage with an electrode active material compared to an electrode current collector; or a metal having a multi-phase with an electrode active material.

13. The structure of claim 1, wherein the tube comprises a semiconductor element and an oxide of the semiconductor element, and the oxide of the semiconductor element includes $SiO_x$, wherein $0.3 \leq x \leq 1.2$, $GeO_y$, wherein $0.2 \leq y \leq 1.1$, $SnO_z$, wherein $0.3 \leq z \leq 1.2$ or a combination thereof.

14. The structure of claim 1, wherein the structure further comprises an alloy of the metal and the lithium metal, which is formed at an interface between the metal and the lithium metal.

15. The structure of claim 14, wherein the alloy of the metal and the lithium metal is Li$x$Au, wherein x is a real number of $0 < x \leq 3.75$.

16. The structure of claim 1, wherein a volume ratio (α) of the lithium metal with respect to a free volume of the tube is $0 < \alpha \leq 1$ by the following Equation 2:

$$\alpha = V_{Li}/V_F \quad \text{[Equation 2]}$$

in Equation 2, $V_F$ is a free volume of the tube and $V_{Li}$ is a volume of the lithium metal, and the $V_F$ is calculated by the following Equation 3:

$$V_F = \pi(D_{in}/2)^2 L \quad \text{[Equation 3]}$$

in Equation 3, $D_{in}$ is an inner diameter of the tube and L is a length of the tube.

* * * * *